United States Patent [19]
Wagster et al.

[11] Patent Number: 4,979,386

[45] Date of Patent: Dec. 25, 1990

[54] DEVELOPER ROLL ADJUSTMENT INDICATOR DEVICE

[75] Inventors: Michael K. Wagster; Leonard G. Ward, both of Melbourne, Fla.

[73] Assignee: Storage Technology Corporation, Louisville, Colo.

[21] Appl. No.: 501,619

[22] Filed: Mar. 28, 1990

[51] Int. Cl.[5] ....................... G03G 21/00; G01C 17/38

[52] U.S. Cl. ....................................... 73/1 E; 33/1 N; 355/202; 355/203

[58] Field of Search ............... 355/245, 251, 200, 133, 355/203, 202; 73/1 E; 33/1 N, 1 PT, 534, 538

[56] References Cited

U.S. PATENT DOCUMENTS

| | | | |
|---|---|---|---|
| 4,250,513 | 2/1981 | Harlow et al. | 346/153.1 |
| 4,334,772 | 6/1982 | Suzuki | 355/251 |
| 4,439,034 | 3/1984 | Daniels | 118/658 |
| 4,466,730 | 8/1984 | Jugle | 355/215 |
| 4,470,693 | 9/1984 | Dolan | 355/300 |
| 4,690,540 | 9/1987 | Manno | 355/253 |

*Primary Examiner*—A. T. Grimley
*Assistant Examiner*—Nestor R. Ramirez
*Attorney, Agent, or Firm*—Dorr, Carson, Sloan & Peterson

[57] ABSTRACT

A developer roll adjustment indicator device for use in association with a xerographic printer has an indicator plate with a collar that is removably secured to the end of the print drum shaft. A pointer made of a material having a magnetic attraction to the magnetic brushes in the developer roll is attached to the collar to permit the distal end of the pointer to freely rotate with respect to the axis of the print drum in response to the relative angular position of the magnetic brushes. The indicator plate has a number of visual indicia to measure the angular relationship of the pointer with respect to the axis of the print drum. Proper angular orientation of the indicator plate on the print drum shaft during installation is verified by means of a bubble level which provides a fixed point of reference for angular measurements.

14 Claims, 3 Drawing Sheets

DEVELOPER ROLL ADJUSTMENT INDICATOR DEVICE

BACKGROUND OF THE INVENTION

1. Field of the Invention

The present invention relates generally to the field of xerographic printing. More specifically, the present invention discloses a device to assist in properly orienting the magnetic brush in the developer station of a xerographic printer.

2. Statement of the Problem

Conventional xerographic copiers and printers reproduce images by creating a latent electrostatic image on a rotating print drum having a photoconductive surface. Following exposure, the latent electrostatic image on the print drum is developed at a developing station which in typical present day practice, comprises one or more magnetic brushes for bringing a developer in powder form, usually a mixture of carrier beads and toner, into developing relation with the surface of the print drum and the image thereon. This is conventionally accomplished by a developer roll having thin, cylindrical outer wall which is rotatably mounted parallel to the print drum. The lower portion of the developer roll passes through a sump containing the developer. A thin layer of developer adheres to the outer surface of the developer roll as it rotates. A small spacing is maintained between the developer roll and the print drum. A number of stationery magnetic brushes extend longitudinally within the developer roll adjacent to the line of minimum spacing between the print drum and developer roll. The lines of force created by the magnetic brushes pass through the wall of the developer roll and cause the developer particles to stand on end, similar to the way in which iron filings align themselves to follow the lines of force of a magnetic field. This alignment of the developer particles by the magnetic brushes causes them to bridge the gap separating the developer roll from the print drum, and thereby be applied to the latent image on the print drum. Following application of the developer, the developed image is transferred at a transfer station to a copy substrate material such as a sheet of paper. Print quality is adversely affected if the proper angular relationship between the print drum and the magnetic brushes within the developer roll is not maintained. The developer roll typically provides some means to permit small adjustments in the angular position of the magnetic brushes. However, heretofore, adjustment of this angular relationship to achieve optimal print quality has largely been a matter of trial and error.

The prior art contains several other examples of xerographic copiers and printers which use a magnetic brush within a developer roll to apply developer to the print drum, including the following:

| Inventor | U.S. Pat. No. | Issue Date |
|---|---|---|
| Harlow, et al. | 4,250,513 | Feb. 10, 1981 |
| Suzuki | 4,334,772 | June 15, 1982 |
| Daniels | 4,439,034 | Mar. 27, 1984 |
| Jugle | 4,466,730 | Aug. 21, 1984 |
| Dolan | 4,470,693 | Sep. 11, 1984 |
| Manno | 4,690,540 | Sep. 1, 1987 |

Harlow, et al., disclose a linear vertical adjustment mechanism for a printer. This device has particular application to align an ink or toner applicator member, such as a magnetic ink brush, with respect to a recording medium to insure that the magnetic brush is parallel to the recording medium, and thereby prevent variation in the print intensity across the width of the print medium.

Suzuki discloses an electrophotographic apparatus having a magnetic brush assembly that is somewhat similar to the magnetic brush assembly found in the types of printer that can be adjusted using the present invention.

Daniels discloses a method and apparatus for purging developer mix from the magnetic brush roller by rotating the magnets of the magnetic brush roller.

Jugle discloses an electrophotographic apparatus in which the amount of developer material being transported to the electrostatic latent image recorded on the photoconductive belt is controlled by a metering blade. The accumulation of surplus toner particles on the blade is prevented by inducing a flow of air through apertures in the blade.

Dolan discloses a self-cleaning xerographic apparatus in which the magnetic brush is used to both apply toner to an image on a photoconductive surface and clean the surface in the same cycle.

Manno discloses a developer system for reproduction and printing machines. A magnetic brush roll is used to apply developer with the print drum.

3. Solution to the Problem

None of the prior art references uncovered in the search show a device for measuring the angular relationship between the print drum axis and the magnetic brushes within the developer roll, to aid in proper angular adjustment of the magnetic brushes to optimize print quality.

SUMMARY OF THE INVENTION

This invention provides a developer roll adjustment indicator device for use in association with a xerographic printer having an indicator plate with a collar that is removably secured to the end of the print drum shaft. A pointer made of a material having a magnetic attraction to the magnetic brushes within the developer roll is attached to the collar to permit the distal end of the pointer to freely rotate with respect to the axis of the print drum in response to the relative angular position of the magnetic brushes. The indicator plate has a number of visual indicia to measure the angular relationship of the pointer with respect to the axis of the print drum. Proper angular orientation of the indicator plate on the print drum shaft during installation is verified by means of a bubble level which provides a fixed point of reference for angular measurements.

A primary object of the present invention is to provide an indicator permitting quick and easy measurement of the angular relationship between the print drum axis and the magnetic brushes within the developer roll.

Another object of the present invention is to provide a compact, readily transportable indicator that is relatively inexpensive to manufacture, and that can be used in the field with minimal training.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
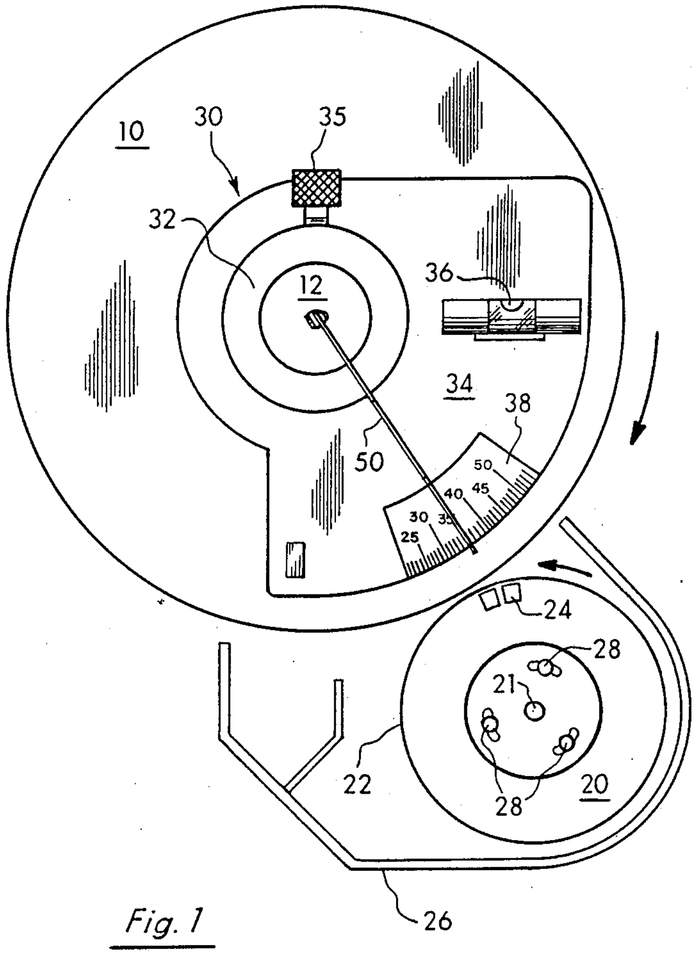
FIG. 1 is a front plan view of the present invention installed on the axle of the print drum of a xerographic printer. This figure also shows an end view of the developer station of the printer.

Turning to FIG. 1, an end view of a conventional print drum 10 and developer roll assembly 20 is shown with conjunction with the components of the present invention. The cylindrical print drum 10 typically rotates in a clockwise direction about a central shaft 12. The developer roll assembly 20 has a thin outer wall 22 which rotates in a counter-clockwise direction about a central axis 21 parallel to the axis of rotation of the print drum 10. The sump 26 used to contain developer is also shown in FIG. 1. A number of magnetic brushes 24 extend longitudinally beneath the surface 22 of the developer roll 20, generally parallel to its central axis 21. These magnetic brushes 24 are generally stationery, but small adjustments in their angular position with respect to the central axis 21 can be made by loosening a series of adjustment screws 28.

Figure 2:
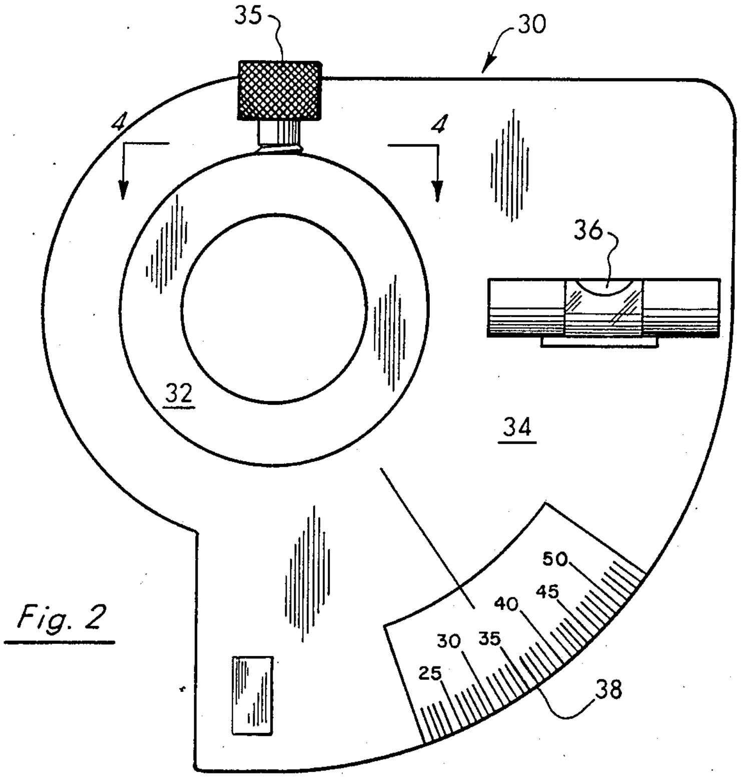
FIG. 2 is a front plan view of the hub and face plate of the device shown in FIG. 1.
Figure 3:
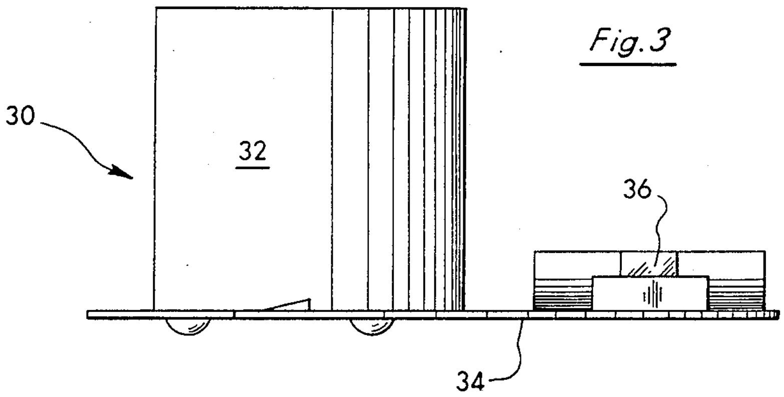
FIG. 3 is a bottom view of the hub and face plate corresponding to FIG. 2.

The major components of present device are an indicator plate 30 and a pointer 50, as shown in FIG. 1. The indicator plate 30 is pictured in greater detail in FIGS. 2–4. The indicator plate 30 has an annular collar 32 adapted to removably fit over the end of the print drum shaft 12. A generally flat face 34 extends radially outward from the collar perpendicular to the axis of rotation of the print drum 10. Visual indicia 38 are marked on the face 34 of the indicator plate to provide a scale for measurement of an angular relationship with respect to the axis of the print drum 10. A bubble level 36 is attached to indicator plate 30. During installation of the indicator plate 30 on the print drum shaft 12, this bubble level 31 is used to provide a reference for proper angular orientation of the indicator plate. Once proper orientation is achieved, a set screw 35 threaded through hole 42 in the collar 32 is tightened to secure the indicator plate 30 to the print drum shaft 12.

Figure 5:
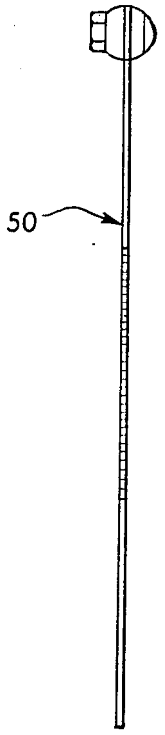
FIG. 5 is a front plan view of the pointer shown in FIG. 1.
Figure 6:
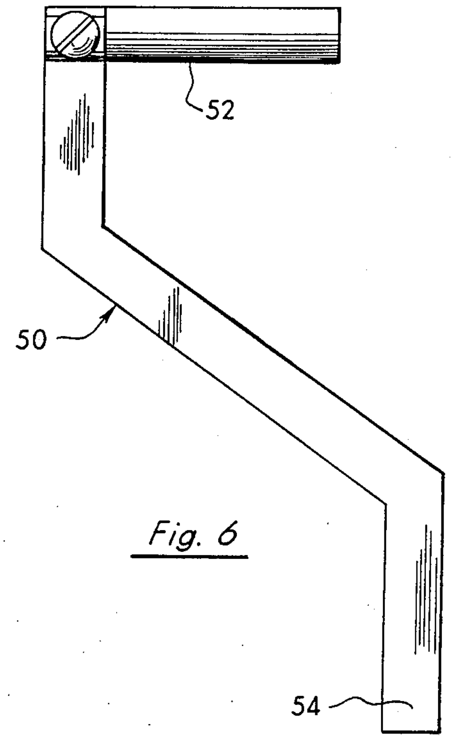
FIG. 6 is a side view of the pointer shown in FIG. 5.

The pointer 50 is pictured in greater detail in FIGS. 5 and 6. The distal end 54 of the pointer 50 is made of a material, such as iron, that is magnetically attracted to the magnetic brushes 24 housed within the developer roll 20. The base end 52 of the pointer 50 is removably attached either to the print drum shaft 12 or to the collar 32 to permit the distal end 54 of the pointer 50 to freely rotate with respect to the print drum axis 12 in response to the relative angular position of the magnetic brushes 24. In this manner, the pointer 50 acts a compass by rotating to point toward the center of the magnetic field produced by the magnetic brushes 24. The angular relationship between the print drum axis 12 and the magnetic brushes 24 can then be measured by observing the position of the pointer 50 with respect to the visual indicia 38 on the face of the indicator plate 34.

Figure 4:
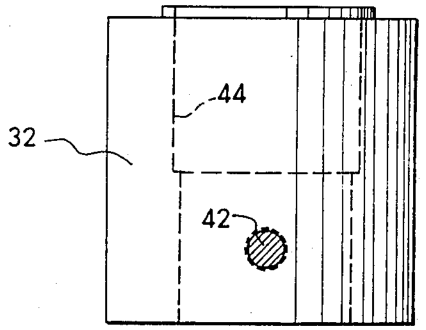
FIG. 4 is a top view of the hub showing the interior surfaces of the hub as hidden lines.

In the preferred embodiment shown in FIG. 4, the collar 32 of the indicator plate 34 has a generally cylindrical shape. A first cylindrical recess in one end is adapted to fit over the end of the print drum shaft 12. A second cylindrical recess extending inward from the opposing end of the collar has a cylindrical interior surface 44 with a slightly larger radius than the first recess. As shown in FIG. 6, the pointer 50 has a pivot edge 52 extending along its base which is adapted to support the pointer on interior surface 44 of the collar 32. This edge 52 is relatively sharp so as to balance the pointer with respect to an arbitrary line on the interior surface 44 of the collar 32. Magnetic attraction between the distal end 54 of the pointer and the magnetic brushes 24 causes the pointer 50 to pivot about this edge 52 and thereby permit the pointer 50 to point toward the center of the magnetic field created by the magnetic brushes 24.

In the field, the present device can be used in the following method:

(1) Open the printer and slip the collar 32 of the indicator plate 30 over the exposed end of the print drum shaft 12.

(2) Adjust the angular orientation of the indicator plate 30 on the print drum shaft 12 until the bubble in the bubble level 36 is centered, and then tighten the set screw 35 to fix the position of the indicator plate 30.

(3) Insert the base 52 of the pointer 50 into the recess on the outer end of the indicator plate collar 32 so that the edge of the base 52 is balanced on its interior surface 44. Make sure the pointer 50 can move freely and is attracted to the magnetic flux emanating from the magnetic brushes 24 in the developer roll 20.

(4) Look directly at the graduated scale 38 on the face 34 of the indicator plate 30, and note the angle formed by the pointer 50.

(5) If the angle shown on the scale 38 is not within specifications, loosen the adjustment screws 28 on the developer roll 20 and rotate the magnetic brushes 24 to achieve the correct angle. Retighten the adjustment scres 28 when finished.

The above disclosure sets forth a number of embodiments of the present invention. Other arrangements or embodiments, not precisely set forth, could be practiced under the teachings of the present invention and as set forth in the following claims.

We claim:

1. A developer roll adjustment indicator device for use in association with a xerographic printer having a substantially cylindrical print drum rotatably mounted on a shaft about an axis of rotation; a substantially cylindrical developer roll having a thin outer wall rotatably mounted about an axis substantially parallel to the axis of said print drum; a number of magnetic brushes extending longitudinally within the outer wall of said developer roll; said device comprising:

an elongated pointer having a distal end formed of a material having a magnetic attraction to said magnetic brushes;

an indicator means removably attached to said print drum adapted to provide a visual indication of the angular orientation of said pointer with respect to the axis of said print drum; and means for removably attaching said pointer to said indicator means to permit the distal end of said pointer to freely rotate with respect to the axis of said print drum in response to the relative angular position of said magnetic brushes.

2. The developer roll adjustment indicator device of claim 1, further comprising a level sensing means attached to said indicator means, adapted to provide a reference for indication of proper angular orientation of said indicator means with respect to the axis of said print drum.

3. The developer roll adjustment indicator device of claim 2, wherein said level sensing means comprises a bubble level.

4. The developer roll adjustment indicator device of claim 1, wherein the distal end of said pointer is made of iron.

5. The developer roll adjustment indicator device of claim 1, wherein said indicator means comprises:

a collar adapted to removably attach to the shaft of said print drum;

a plate extending radially outward from said collar having visual indicia for measuring the angular relationship of the distal end of said pointer with respect to the axis of said print drum; and a bubble level attached to said indicator means, adapted to provide a visual indication of proper angular orientation of said visual indicia with respect to the axis of said print drum.

6. The developer roll adjustment indicator device of claim 5 further comprising a set screw extending through said collar, adapted to removably secure said collar to the shaft of said print drum.

7. A developer roll adjustment indicator device for use in association with a xerographic printer having a substantially cylindrical print drum rotatably mounted on a shaft; a substantially cylindrical developer roll having a thin outer wall rotatably mounted about an axis substantially parallel to the shaft of said print drum; and a number of magnetic brushes extending longitudinally within the outer wall of said developer roll; said device comprising:

an elongated pointer having a distal end formed of a material having a magnetic attraction to said magnetic brushes, and a base end removably and rotatably attached to the shaft of said print drum to permit the distal end of said pointer to freely rotate with respect to the shaft of said print drum in response to the relative angular position of said magnetic brushes;

a collar adapted to removably attach to the shaft of said print drum;

a plate extending radially outward from said collar having visual indicia for measuring the angular relationship of the distal end of said pointer with respect to the shaft of said print drum; and a level indicating means adapted to provide a reference for proper angular orientation of said visual indicia with respect to the shaft of said print drum.

8. The developer roll adjustment indicator device of claim 7, wherein said collar comprises two opposing ends with a first substantially cylindrical recess in said first end adapted to removably fit over the shaft of said print drum, and a second substantially cylindrical recess in said second end in substantial axial alignment with said first recess.

9. The developer roll adjustment indicator device of claim 8, wherein said pointer comprises:

a base portion having an edge adapted to support said pointer in the second cylindrical recess of said collar; and a distal portion extending from said base portion made of a material having a magnetic attraction to said magnetic brushes.

10. The developer roll adjustment indicator device of claim 7, wherein said collar comprises a substantially tubular sleeve with two opposing ends, one end of said sleeve adapted to removably fit over the shaft of said print drum and the second end of said sleeve extending a predetermined distance beyond the end of said shaft, said tubular sleeve having a substantially cylindrical interior surface adjacent to said second end.

11. A developer roll adjustment indicator device for use in association with a xerographic printer having a substantially cylindrical print drum rotatably mounted on a shaft; a substantially cylindrical developer roll having a thin outer wall rotatably mounted about an axis substantially parallel to the shaft of said print drum; and a number of magnetic brushes extending longitudinally within the outer wall of said developer roll; said device comprising:

a collar having a substantially tubular sleeve with two ends, one end of said sleeve adapted to removably fit over the shaft of said print drum and the second end of said sleeve extending a predetermined distance beyond the end of said shaft, said tubular sleeve having a substantially cylindrical interior surface adjacent to said second end;

an elongated pointer having:

(a) a distal portion made of a material having a magnetic attraction to said magnetic brushes;

(b) a base portion having an edge adapted to balance and support said pointer on the interior surface of said collar to permit the distal end of said pointer to freely rotate in response to the relative angular position of said magnetic brushes; and a plate extending radially outward from said collar having visual indicia for measuring the angular relationship of the distal end of said pointer with respect to the shaft of said print drum; and a level indicating means adapted to provide a reference for proper angular orientation of said visual indicia with respect to the shaft of said print drum.

12. The developer roll adjustment indicator device of claim 11 further comprising a set screw extending through said collar adjacent to its first end, adapted to removably secure said collar to the shaft of said print drum.

13. The developer roll adjustment indicator device of claim 11 wherein said level indicating means comprises a bubble level attached to said plate.

14. A developer roll adjustment indicator device for use in association with a xerographic printer having a substantially cylindrical print drum rotatably mounted on a shaft; a substantially cylindrical developer roll having a thin outer wall rotatably mounted about an axis substantially parallel to the shaft of said print drum; and a number of magnetic brushes extending longitudinally within the outer wall of said developer roll; said device comprising:

a collar having two opposing ends with a first substantially cylindrical recess in said first end adapted to removably fit over the shaft of said print drum, and a second recess in said second end in substantial axial alignment with said first recess;

an elongated pointer having:

(a) a distal portion made of a material having a magnetic attraction to said magnetic brushes;

(b) a base portion having an edge adapted to balance and support said pointer in the second recess of said collar to permit the distal end of said pointer to freely rotate in response to the relative angular position of said magnetic brushes; and a plate extending radially outward from said collar having visual indicia for measuring the angular relationship of said pointer with respect to the shaft of said print drum; and a level indicating means adapted to provide a reference for proper angular orientation of said visual indicia with respect to the shaft of said print drum.

* * * * *